US007007963B2

(12) United States Patent
Meyer

(10) Patent No.: US 7,007,963 B2
(45) Date of Patent: Mar. 7, 2006

(54) RAISING WHEEL CHAIR

(75) Inventor: Bruno Meyer, Wohlen (CH)

(73) Assignee: Levo AG, Wohlen (CH)

( * ) Notice: Subject to any disclaimer, the term of this patent is extended or adjusted under 35 U.S.C. 154(b) by 0 days.

(21) Appl. No.: 10/804,135

(22) Filed: Mar. 19, 2004

(65) Prior Publication Data

US 2004/0174058 A1 Sep. 9, 2004

Related U.S. Application Data

(63) Continuation of application No. PCT/CH02/00518, filed on Sep. 20, 2002.

(30) Foreign Application Priority Data

Sep. 21, 2001 (CH) .................................... 1744/01

(51) Int. Cl.
*B62M 1/14* (2006.01)

(52) U.S. Cl. ................................ 280/250.1; 280/304.1

(58) Field of Classification Search ............. 280/250.1, 280/304.1; 297/316, DIG. 10, DIG. 4, 330, 297/103, 104, 300.1, 300.2, 301.5, 308
See application file for complete search history.

(56) References Cited

U.S. PATENT DOCUMENTS

| | | | | |
|---|---|---|---|---|
| 3,191,990 A * | 6/1965 | Rugg et al. | 297/330 |
| 3,630,569 A | 12/1971 | Lory | |
| 4,054,319 A | 10/1977 | Fogg, Jr. et al. | |
| 4,067,249 A | 1/1978 | Deucher | |
| 4,076,304 A | 2/1978 | Deucher | |
| 4,407,543 A | 10/1983 | Mashuda | |
| 4,456,086 A | 6/1984 | Wier et al. | |
| 4,569,556 A * | 2/1986 | Pillot | 297/316 |
| 4,623,194 A | 11/1986 | Pillot | |
| 5,108,202 A * | 4/1992 | Smith | 297/330 |
| 5,127,709 A * | 7/1992 | Rubinstein et al. | 297/DIG. 4 |
| 5,366,036 A | 11/1994 | Perry | |
| 5,772,226 A * | 6/1998 | Bobichon | 280/250.1 |
| 5,803,545 A | 9/1998 | Guguin | |
| 5,984,338 A | 11/1999 | Meyer | |
| 6,095,611 A * | 8/2000 | Bar et al. | 297/354.12 |
| 6,129,415 A * | 10/2000 | Galloway | 297/DIG. 4 |
| 6,158,810 A * | 12/2000 | Galloway | 297/354.1 |
| 6,179,076 B1 | 1/2001 | Fernie et al. | |
| 6,588,792 B1 * | 7/2003 | Koerlin et al. | 280/650 |
| 6,733,074 B1 * | 5/2004 | Groth | 297/284.4 |

FOREIGN PATENT DOCUMENTS

| | | |
|---|---|---|
| EP | 0 526 088 A1 | 2/1993 |
| FR | 2 589 341 | 5/1987 |
| FR | 2 697 418 | 5/1994 |
| WO | 79/00647 | 9/1979 |
| WO | 82/01314 | 4/1982 |
| WO | 01/87219 A1 | 11/2001 |

* cited by examiner

*Primary Examiner*—Hau Phan
(74) *Attorney, Agent, or Firm*—Buchanan Ingersoll PC

(57) ABSTRACT

A raising wheel chair includes a raising frame with a lever parallelogram to maintain a backrest upright both in sitting and standing position of the user. A lever provides a movement of the backrest in such a way that no movement between the backrest and the body of the user takes place when a change from sitting to standing or lying takes place.

6 Claims, 4 Drawing Sheets

PRIOR ART

RAISING WHEEL CHAIR

CROSS REFERENCE TO RELATED APPLICATIONS

This application claims priority under 35 U.S.C. §119 to Swiss Application 1744/01 filed in Switzerland on 21 Sep. 2001, and as a continuation application under 35 U.S.C. §120 to PCT/CH02/00518 filed as an International Application on 20 Sep. 2002 designating the U.S., the entire contents of which are hereby incorporated by reference in their entireties.

This application corresponds to commonly assigned U.S. Patent Application entitled "RAISING WHEEL CHAIR," Ser. No. 10/804,154, which is filed on even date herewith and which is hereby incorporated herein by reference in its entirety.

BACKGROUND

A raising wheel chair is disclosed comprising a wheel frame and a raising frame, said raising frame being connected to the frontal portion of the wheel frame and comprising a seat support with a seat, a backrest support with a backrest and means for maintaining the backrest vertical in the sitting position as well as in the standing position of the user.

Different raising wheel chairs are known to be capable of moving a person from the sitting position to a standing position. The raising wheel chair according to U.S. Pat. No. 5,366,036 also permits the movement of a person into a lying position. Most of the prior art raising wheel chairs have the disadvantage that on a stand-up motion or a sit-down motion a relative motion takes place between the person and the surfaces of the chair making contact with the body of the person. This gives the person an unpleasant feeling and often a so-called shirt pulling effect takes place. To avoid a motion between the backrest and the body of the person in changing from the standing position to the sitting position, and vice versa, U.S. Pat. No. 4,067,249 proposed to pivotally mount the backrest on the rear part of the seat at a distance above the sitting surface, so that the pivoting axis is located in the proximity of the hip joint of the person. This, however, has the disadvantage that in lying position the transfer of the person from the raising chair into the bed is hindered by a protruding part of the chair.

In WO 82/01314 a raising chair is described comprising a seat frame and a backrest frame. In the seat frame a seat is located. The seat frame has on both sides a sidewall to which at the front part and in the region above the hip joint of the user levers are pivotally connected for moving the seat from the sitting position to the standing position. The backrest which is movable in the backrest frame is on both sides pivotally connected with a lever to the seat frame, so that on standing up or sitting down the seat back is moved and no substantial movement between the body of the user and the backrest takes place. However, this raising chair has the disadvantage that the seat frame has on both sides high side walls which prevent a lateral transfer of the user. It is not possible to omit the side walls, because three levers are connected thereto. It is further of disadvantage that the backrest cannot be tilted downward to permit a horizontal position of the user.

French patent application FR 2,589,341 discloses a wheel chair where the backrest has on each side a rod which can be moved in a tube. This permits an adjustment of the highs of the backrest with respect to the user of the wheel chair.

The tubes are connected by a horizontal bar which can lifted or lowered by a lifting device, but only the backrest will be lifted whereas Me seat remains stationary.

U.S. Pat. No. 5,366,036 describes a raising wheel chair having arm rests capable of being tilted 90 degrees. Accordingly, if the user is in a lying position, a transfer from the wheel chair to the bed and vice versa is not hindered or made impossible by some parts. In the U.S. Pat. No. 5,984,338 a raising wheel chair is described which permits at least in the sitting position a lateral transfer of the user. However, this raising wheel chair does not permit a lying position and has further the disadvantage that a shirt pulling effect can take place.

The disclosures of all of the foregoing patent documents are hereby incorporated by reference in their entireties.

With reference to FIGS. 1 and 2 a prior art raising wheel chair will be described. The prior art raising wheel chair comprises a wheel frame 11 with a pair of front wheels 13 and a pair of rear wheels 15, and a raising frame 21 comprising a seat 17 and a backrest 20. The raising wheel chair further comprises a footrest assembly 23 with a footrest 24. The wheel frame 11 comprises a tubular construction with two side frames 25 which are connected by struts 27,28.

The raising frame 21 is also a tubular construction. The backrest carrier 19 and the seat support bar 42 are pivotally connected at 29. The backrest support 19 has a lever arm 31 which at 33 is pivotally connected with the parallelogram lever 35. The parallelogram lever 35 is in turn pivotally connected at 32 at the wheel frame 11. The seat support bar 32 is pivotally connected at 22 at the wheel frame 11. By the lever parallelogram 34 formed in this way it is assured that in each position of the chair the backrest 20 will remain in practically the same nearly vertical position. A motor 37 serves for the raising motion from the position in FIG. 1 to the position of FIG. 2 or for the motion in opposite direction for sitting down.

SUMMARY

A raising wheel chair is disclosed wherein, by moving the backrest on a stand-up or sit-down motion, a relative motion between the person and the backrest is avoided. When the person is in lying position, a transfer from the raising wheel chair into the bed, and vice versa, is not hindered by any protruding parts.

An advantageous embodiment of the invention provides that the lever which is pivotally connecting the seat support with the pipe section is selectively connectable at different positions at the seat support or the pipe section, respectively. This permits an adjustment to the requirements of users of different sizes.

BRIEF DESCRIPTION OF THE DRAWINGS

An exemplary embodiment will be described with reference to the drawing, wherein.

DETAILED DESCRIPTION

Figure 3:
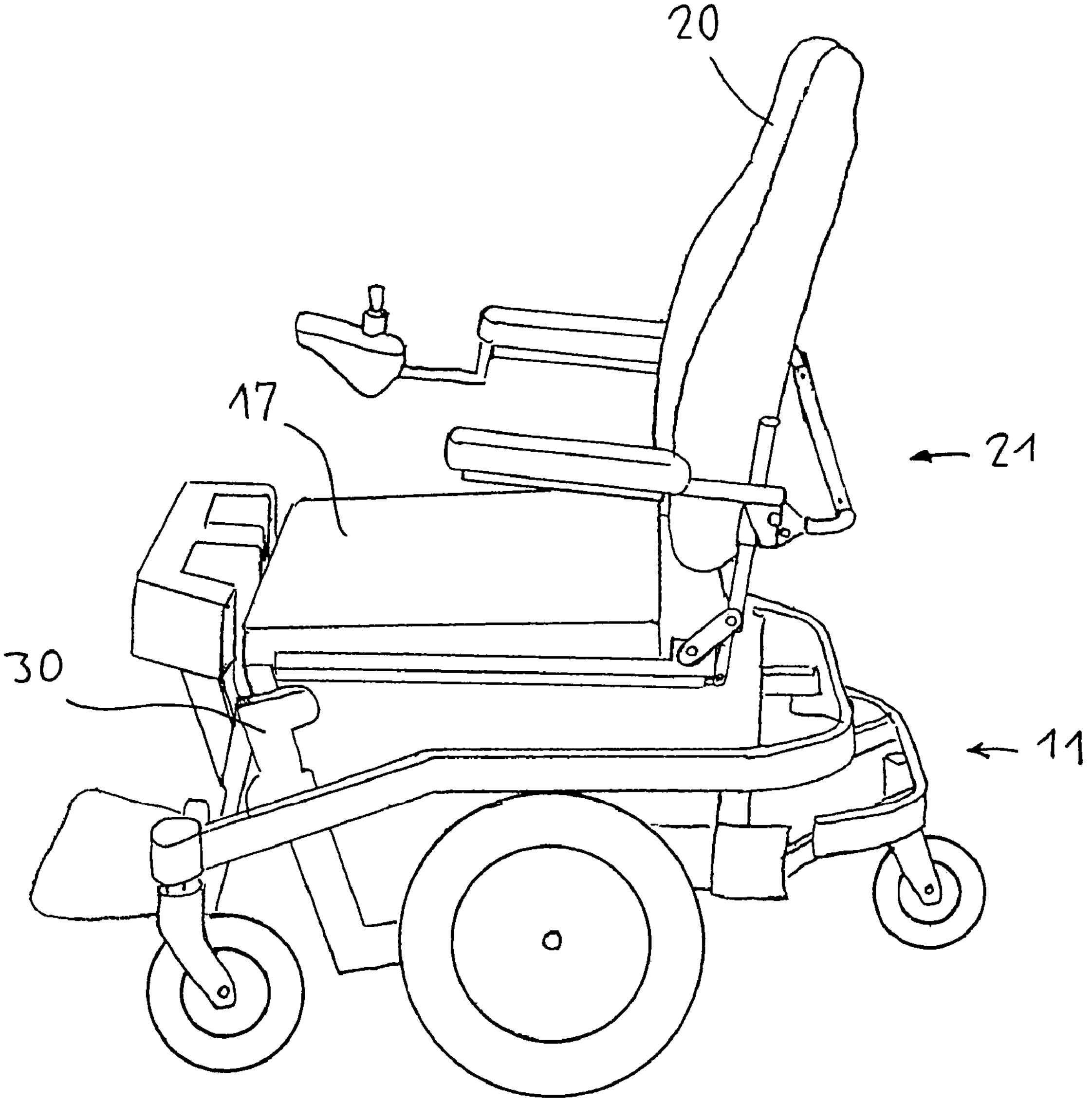
FIG. 3 shows a perspective view of an exemplary electromotoric raising wheel chair.

The present invention can be applied to all kinds of raising wheel chairs. In FIG. 3 an electromotoric raising wheel chair is shown. This raising wheel chair comprises a wheel frame 11 and a raising frame 21 which can be vertically lifted and lowered by a lifting device 30 as described in an application of the same day. The raising frame is shown in more details in the FIGS. 4 to 6.

Figure 1:
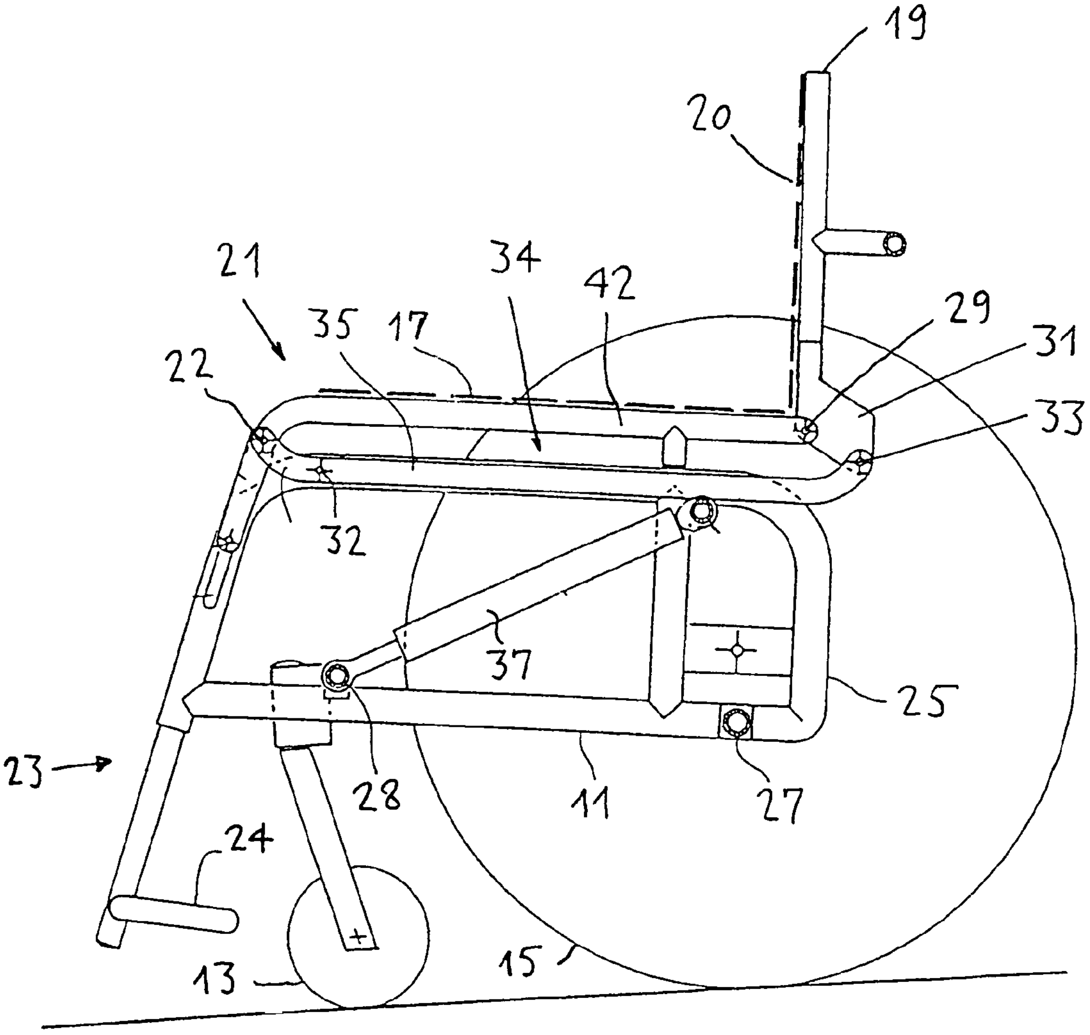
FIG. 1 shows a cross section through a prior art raising wheel chair in sitting position.
Figure 4:
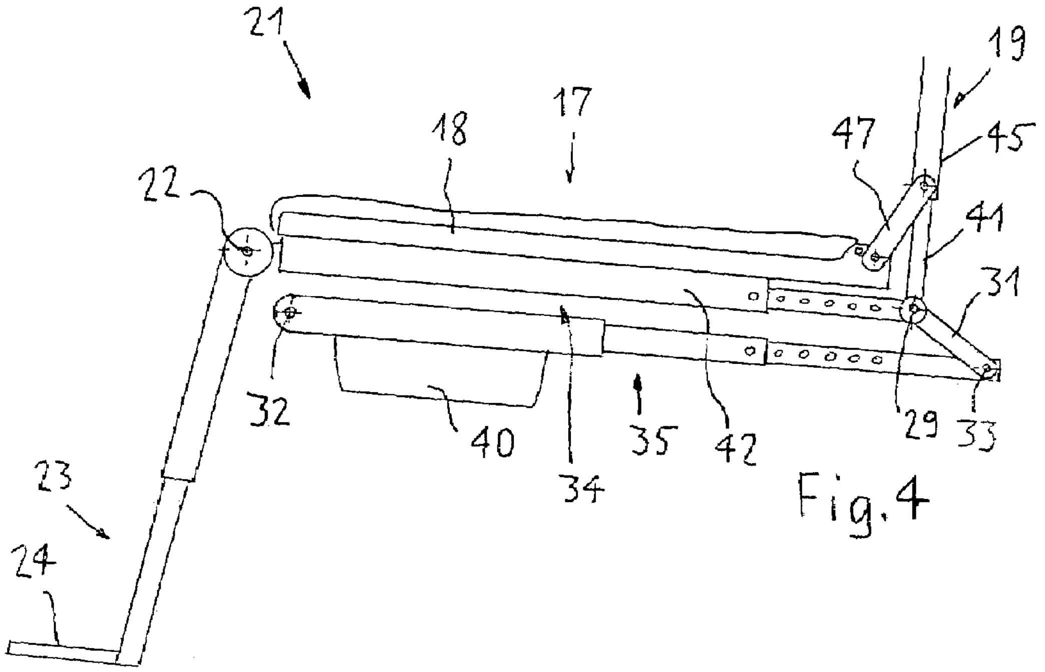
FIG. 4 shows an exemplary embodiment of the raising wheel chair, but only showing the raising frame; and, FIG. 5 shows an enlarged representation of a section from FIG. 4.
Figure 6:
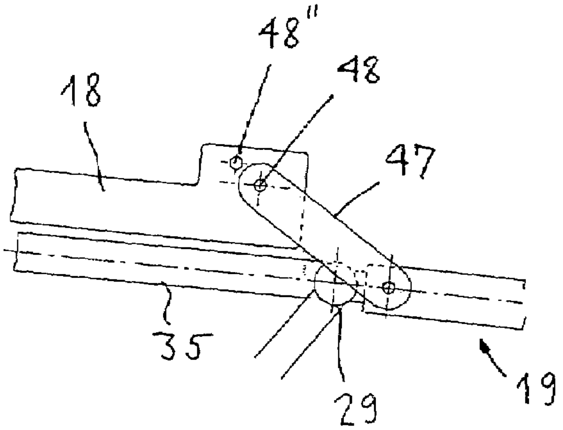
FIG. 6 shows a section as in FIG. 5, but with the backrest in lying position.
Figure 5:
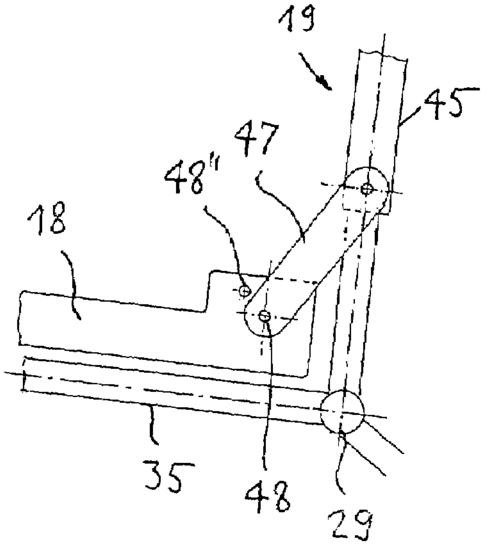

The raising frame 21 shown in FIGS. 4 to 6 includes features similar to those of the raising frame of the raising wheel chair described before with reference to the FIGS. 1 and 2. For the same parts or parts with the same function the same reference numerals are used as in the FIGS. 1 and 2. The raising frame 21 is substantially a tubular construction with the seat support bars 42 of the seat 17 being pivotally connected at 22 on the wheel frame (not shown) The seat back support 19 and the seat support bars 42 are pivotally connected at 29. The seat back support 19 comprises a lever arm 31 being pivotally connected at 33 with the parallelogram lever 35. The parallelogram lever 35 is pivotally connected at 32 at the wheel frame (not shown). The lever parallelogram 34 provided in this way is responsible for keeping the backrest 20 (FIG. 3) in practically vertical position both in the sitting position as in the stand-up position.

To permit a person to lie down, means are provided to reduce the length of the parallelogram lever 35. For this purpose a motor 40 may be used. By this motor 40 a force can be applied to the lever arm 31 to tilt the backrest downward. On the embodiment shown the seat carrier bar 42 and the parallelogram bar 35 are telescopic to permit a change of the distance between the backrest 20 and the front edge of the seat.

The seat back support 19 is provided on each side with a column 41 and a tube section; 45 to permit a telescopic movement of the seat back 20 on the columns 41. On both sides of the seat support a lever 47 is pivotally connecting the seat support 18 with the pipe section 45 in such a way that on a change from the sitting position (FIGS. 4 and 5) to the lying position (FIG. 6), the seat back 20 is moved towards the seat 17.

Figure 2:
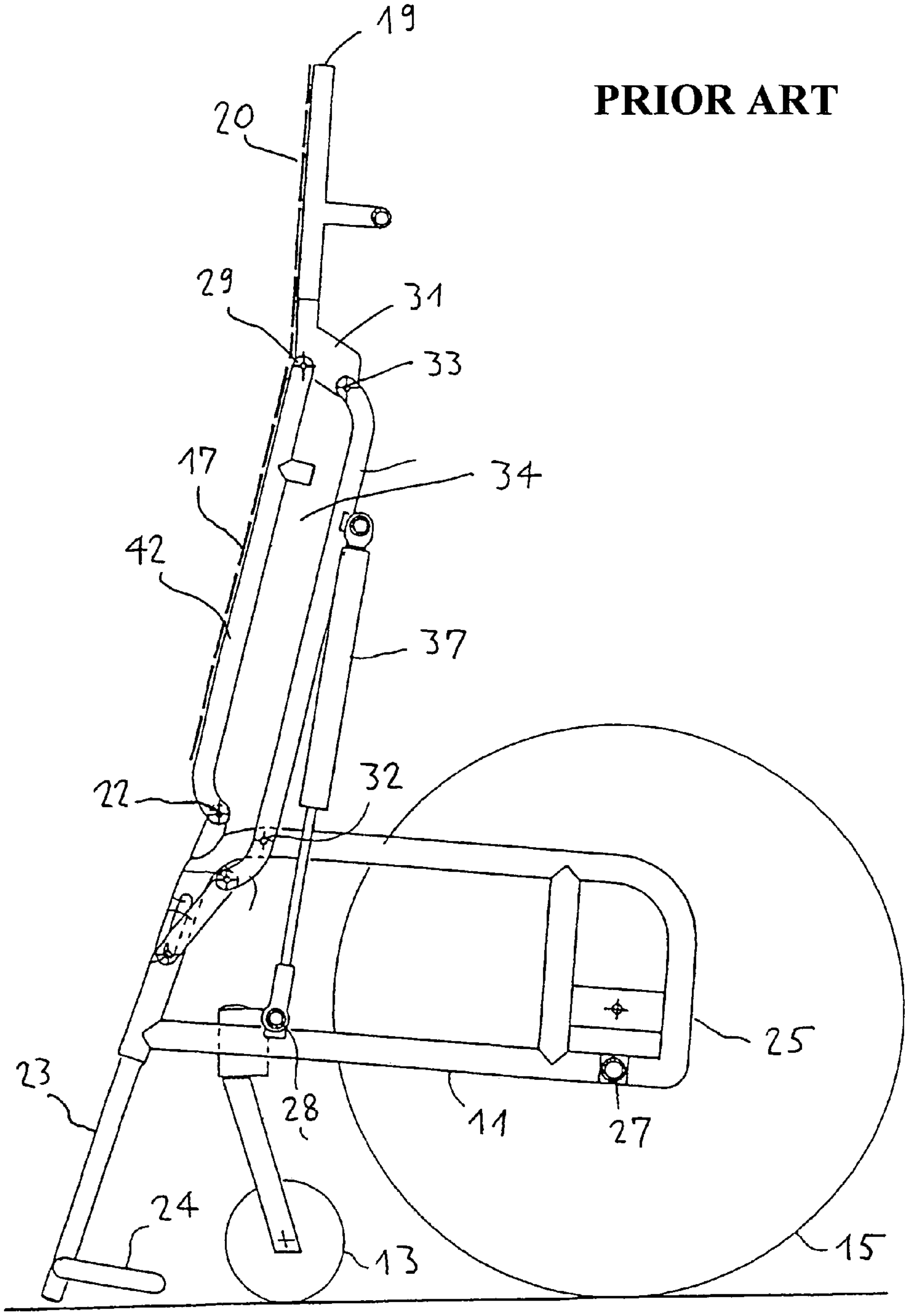
FIG. 2 shows a cross section through the prior art wheel chair of FIG. 1 in stand-up position.

If FIG. 6 is turned counter clock wise by 90 degrees it visualizes the standing position as in FIG. 2. The lever 47 can selectively be connected e.g. at three different locations 48,48',48" to vary the amount the seat back is moved.

To summarize the following can be noted:

The raising wheel chair comprises a raising frame 21 with a lever parallelogram 34 to maintain the backrest 20 upright both in slitting and standing position of the user. A lever 47 provides a movement of the backrest in such a way that no movement between the backrest 20 and the body of the user takes place when a change from sitting to standing or lying takes place.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A raising wheel chair comprising:

a wheelframe; and a raising frame, said raising frame being connected to a frontal portion of the wheel frame and comprising a seat support with a seat, a backrest support with a backrest, and on each side of the raising frame a lever parallelogram for maintaining the backrest vertical in a sitting position as well as in a standing position of a user, said lever parallelogram comprising a seat support bar and substantially parallel thereto a parallelogram lever being pivotally connected with one end to the frontal portion of the wheel frame and with another end to the backrest support, wherein the backrest support comprises on each side a column and a pipe section, said pipe section being connected to the backrest and telescopically movable on said column, and wherein a lever is pivotally connected to a rear position of the seat support and to the pipe section for moving, both on a change from the standing position and a change from a lying position to a sitting position, or vice versa, the backrest away from a rear end of the seat support, and toward the rear end of the seat support, respectively.

2. The raising wheel chair as claimed in claim 1, wherein the lever which pivotally connects the seat support with the pipe section is selectively connectable at different positions at the seat support or the pipe section, respectively.

3. The raising wheel chair as claimed in claim 2, wherein the parallelogram lever can be extended or shortened by an electric motor.

4. The raising where chair as claimed in claim 3, wherein the motor is an electric linear motor.

5. The raising wheel chair as claimed in claim 1, wherein the parallelogram lever can be extended or shortened by an electric motor.

6. The raising where chair as claimed in claim 5, wherein the motor is an electric linear motor.

* * * * *